(12) United States Patent
Kawashima et al.

(10) Patent No.: US 11,316,467 B2
(45) Date of Patent: Apr. 26, 2022

(54) INVERTER CONTROLLER AND ON-VEHICLE FLUID MACHINE

(71) Applicant: KABUSHIKI KAISHA TOYOTA JIDOSHOKKI, Aichi-ken (JP)

(72) Inventors: Takashi Kawashima, Aichi-ken (JP); Takashi Ogami, Aichi-ken (JP); Yoshiki Nagata, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 17/168,688

(22) Filed: Feb. 5, 2021

(65) Prior Publication Data

US 2021/0249984 A1   Aug. 12, 2021

(30) Foreign Application Priority Data

Feb. 12, 2020   (JP) .............................. JP2020-021430

(51) Int. Cl.
| | |
|---|---|
| *H02P 27/12* | (2006.01) |
| *H02P 21/18* | (2016.01) |
| *B60H 1/00* | (2006.01) |
| *H02P 21/22* | (2016.01) |

(52) U.S. Cl.
CPC .......... *H02P 27/12* (2013.01); *B60H 1/00428* (2013.01); *H02P 21/18* (2016.02); *H02P 21/22* (2016.02); *H02P 2209/01* (2013.01)

(58) Field of Classification Search
CPC .......... H02P 27/12; H02P 21/18; H02P 21/22; H02P 2209/01

USPC .............................. 318/400.02, 400.01, 700
See application file for complete search history.

(56) References Cited

U.S. PATENT DOCUMENTS

| | | | |
|---|---|---|---|
| 9,590,552 B2 | 7/2017 | Nagata et al. | |
| 10,367,438 B2 * | 7/2019 | Araki | ...................... H02P 27/06 |
| 2015/0311845 A1 | 10/2015 | Nagata et al. | |

FOREIGN PATENT DOCUMENTS

JP   2015-208187   11/2015

* cited by examiner

*Primary Examiner* — David Luo
(74) *Attorney, Agent, or Firm* — Greenblum & Bernstein, P.L.C.

(57) ABSTRACT

An inverter controller is configured to control an inverter circuit that drives an on-vehicle electric motor by using an on-vehicle electricity storage device. The inverter controller includes a two-phase voltage command value deriving unit that derives two-phase voltage command values on the basis of an external command value delivered from an external device and an acquisition result of a speed acquiring unit, and a three-phase voltage command value deriving unit that derives three-phase voltage command values on the basis of the two-phase voltage command values. The three-phase voltage command value deriving unit derives the three-phase voltage command values on the basis of a voltage utilization factor, which is calculated on the basis of the two-phase voltage command values and the acquisition result.

7 Claims, 5 Drawing Sheets

INVERTER CONTROLLER AND ON-VEHICLE FLUID MACHINE

BACKGROUND

1. Field

The present disclosure relates to an inverter controller and an on-vehicle fluid machine.

2. Description of Related Art

For example, Japanese Laid-Open Patent Publication No. 2015-208187 discloses an inverter controller used to control an inverter circuit that drives an on-vehicle electric motor by using an on-vehicle electricity storage device. The publication discloses that the on-vehicle electric motor is used as a motor of an air conditioner for an automobile and includes three-phase coils, and that the inverter circuit includes three-phase switching elements. The publication also discloses that a drive voltage, which includes three-phase voltage command values, is calculated on the basis of two-phase voltage command values that include an exciting component voltage and a torque component voltage.

In a situation where a voltage utilization factor, which is calculated on the basis of the two-phase voltage command values and the voltage of the on-vehicle electricity storage device, is low, the variation range of the three-phase voltage command values is likely to narrow. In such a case, since the three-phase voltage command values are likely to tilt toward a specific value or a value close to the specific value, the switching elements are likely to perform switching frequently with a specific duty cycle or a duty cycle close to the specific duty cycle. Thus, the noise caused by switching of the switching elements is likely to concentrate on a specific frequency that corresponds to the specific duty cycle. This may locally increase the noise of the specific frequency.

It is an objective of the present disclosure to provide an inverter controller and an on-vehicle fluid machine including the inverter controller that are capable of suppressing a local increase in noise of a specific frequency due to narrowing of the variation range of three-phase voltage command values.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an inverter controller is configured to control an inverter circuit that drives an on-vehicle electric motor by using an on-vehicle electricity storage device. The on-vehicle electric motor includes three-phase coils. The inverter circuit includes three-phase switching elements. The inverter controller includes a speed acquiring unit configured to acquire a rotation speed of the on-vehicle electric motor, a voltage acquiring unit configured to acquire a power supply voltage, which is a voltage of the on-vehicle electricity storage device, a two-phase voltage command value driving unit, and a three-phase voltage command value deriving unit. The two-phase voltage command value deriving unit is configured to derive two-phase voltage command values on a basis of an external command value delivered from an external device and an acquisition result of the speed acquiring unit. The two-phase voltage command values are target values of voltages applied to a d-axis and a q-axis of the on-vehicle electric motor. The three-phase voltage command value deriving unit is configured to derive three-phase voltage command values applied to the three-phase coils on a basis of the two-phase voltage command values. The inverter controller is configured to subject the three-phase switching elements to PWM control on a basis of the three-phase voltage command values. The three-phase voltage command value deriving unit is configured to derive first three-phase voltage command values in a case in which a voltage utilization factor, which is calculated on a basis of the two-phase voltage command values and the acquisition result of the voltage acquiring unit, is a first voltage utilization factor. The first three-phase voltage command values are obtained by changing a neutral point potential of the three-phase voltage command values at a first neutral point amplitude. The three-phase voltage command value deriving unit is also configured to derive second three-phase voltage command values in a case in which the voltage utilization factor is a second voltage utilization factor, which is less than the first voltage utilization factor. The second three-phase voltage command values are obtained by changing the neutral point potential with a second neutral point amplitude, which is greater than the first neutral point amplitude.

In another general aspect, an on-vehicle fluid machine includes an on-vehicle electric motor, an inverter circuit configured to drive the on-vehicle electric motor by using an on-vehicle electricity storage device, and an inverter controller configured to control the inverter circuit. The on-vehicle electric motor includes three-phase coils. The inverter circuit includes three-phase switching elements. The inverter controller includes a speed acquiring unit configured to acquire a rotation speed of the on-vehicle electric motor, a voltage acquiring unit configured to acquire a power supply voltage, which is a voltage of the on-vehicle electricity storage device, a two-phase voltage command value deriving unit, and a three-phase voltage command value deriving unit. The two-phase voltage command value deriving unit is configured to derive two-phase voltage command values on a basis of an external command value delivered from an outside and an acquisition result of the speed acquiring unit. The two-phase voltage command values are target values of voltages applied to a d-axis and a q-axis of the on-vehicle electric motor. The three-phase voltage command value deriving unit is configured to derive three-phase voltage command values applied to the three-phase coils on a basis of the two-phase voltage command values. The inverter controller is configured to subject the three-phase switching elements to PWM control on a basis of the three-phase voltage command values. The three-phase voltage command value deriving unit is configured to derive first three-phase voltage command values in a case in which a voltage utilization factor, which is calculated on a basis of the two-phase voltage command values and the acquisition result of the voltage acquiring unit, is a first voltage utilization factor. The first three-phase voltage command values are obtained by changing a neutral point potential of the three-phase voltage command values at a first neutral point amplitude. The three-phase voltage command value deriving unit is also configured to derive second three-phase voltage command values in a case in which the voltage utilization factor is a second voltage utilization factor, which is less than the first voltage utilization factor. The second three-phase voltage command values are obtained by changing the neutral point potential at a second neutral point amplitude, which is greater than the first neutral point amplitude.

Other aspects and advantages of the present disclosure will become apparent from the following description, taken in conjunction with the accompanying drawings, illustrating exemplary embodiments.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An inverter controller 14 and an on-vehicle fluid machine equipped with the inverter controller 14 according to an embodiment will now be described. In the present embodiment, the on-vehicle fluid machine is an on-vehicle motor-driven compressor 10, which is used in an on-vehicle air conditioner 101.

An overview of the on-vehicle air conditioner 101 and the on-vehicle motor-driven compressor 10 will now be described.

Figure 1:
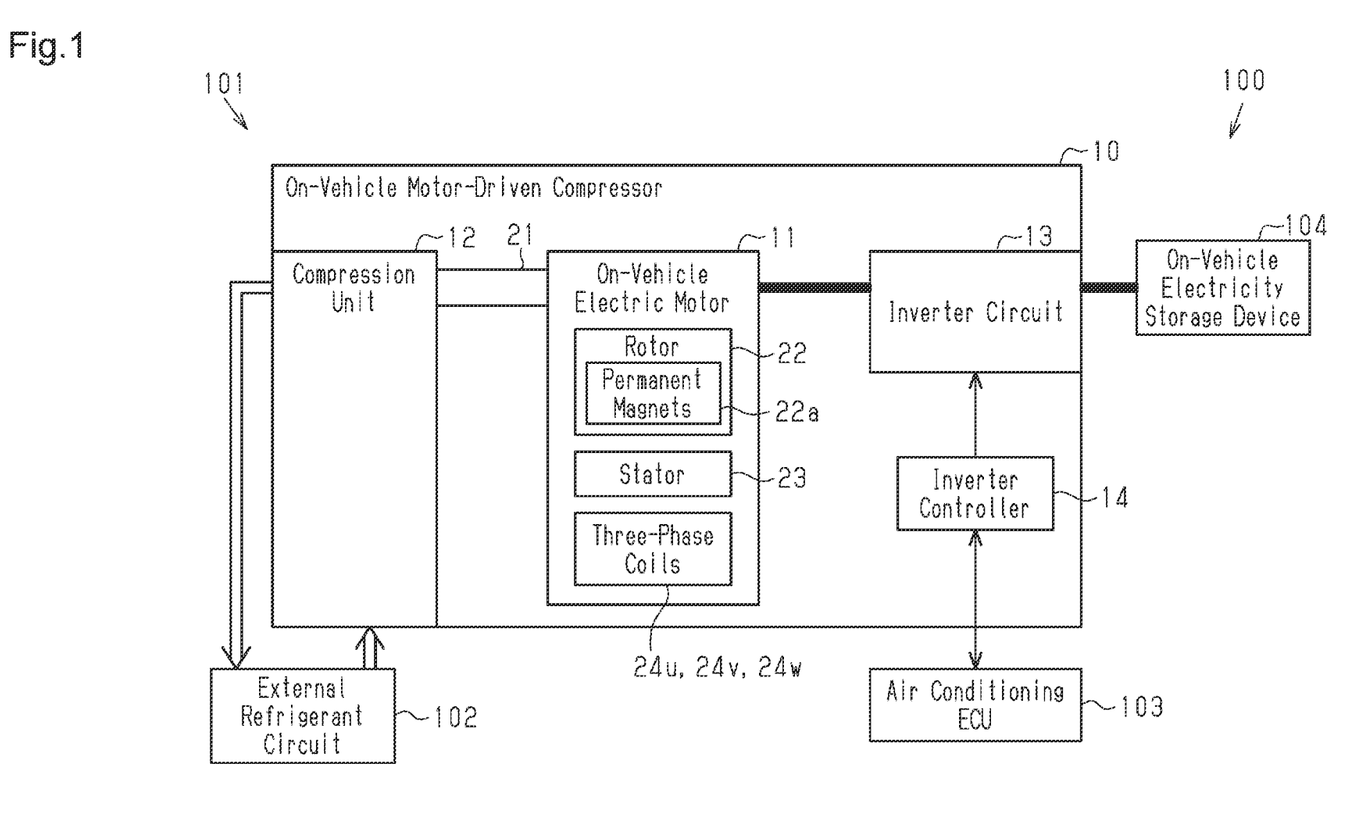
FIG. 1 is a block diagram showing an on-vehicle motor-driven compressor.

As shown in FIG. 1, the on-vehicle air conditioner 101, which is mounted in a vehicle 100, includes the on-vehicle motor-driven compressor 10 and an external refrigerant circuit 102, which supplies refrigerant (fluid) to the on-vehicle motor-driven compressor 10.

The external refrigerant circuit 102 includes, for example, a heat exchanger and an expansion valve. The on-vehicle motor-driven compressor 10 compresses the refrigerant, and the external refrigerant circuit 102 performs heat exchange of the refrigerant and expands the refrigerant. This allows the on-vehicle air conditioner 101 to cool or warm the passenger compartment.

The on-vehicle air conditioner 101 includes an air conditioning ECU 103 that controls the entire on-vehicle air conditioner 101. The air conditioning ECU 103 is configured to obtain the temperature of the passenger compartment and/or a target temperature of the on-vehicle air conditioner 101. On the basis of these parameters, the air conditioning ECU 103 outputs various commands including a command rotation speed Nc to the on-vehicle motor-driven compressor 10.

The vehicle 100 includes an on-vehicle electricity storage device 104. The on-vehicle electricity storage device 104 may be any type as long as it can charge/discharge direct-current power. For example, a rechargeable battery or an electric double-layer capacitor may be employed. The on-vehicle electricity storage device 104 is used as a direct-current power supply for the on-vehicle motor-driven compressor 10.

The on-vehicle motor-driven compressor 10 includes an on-vehicle electric motor 11, a compression unit 12, which is driven by the on-vehicle electric motor 11, an inverter circuit 13, which drives the on-vehicle electric motor 11 using the on-vehicle electricity storage device 104, and the inverter controller 14, which is used to control the inverter circuit 13.

Figure 2:
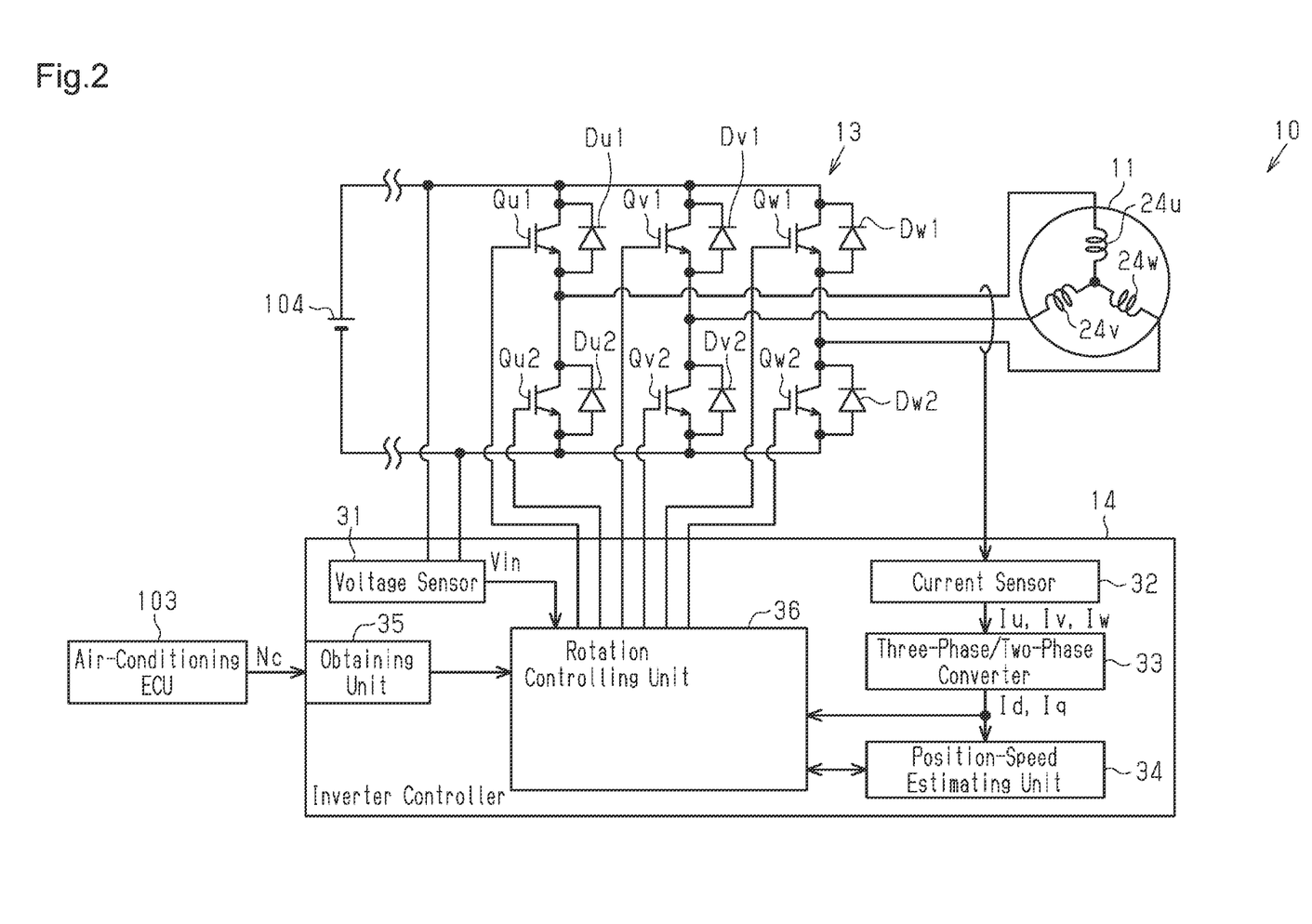
FIG. 2 is a block diagram showing an electrical configuration of an inverter circuit and an inverter controller.

The on-vehicle electric motor 11 includes a rotary shaft 21, a rotor 22 fixed to the rotary shaft 21, a stator 23 arranged to be opposed to the rotor 22, and three-phase coils 24$u$, 24$v$, 24$w$ wound about the stator 23. The rotor 22 includes permanent magnets 22$a$. Specifically, the permanent magnets 22$a$ are embedded in the rotor 22. As shown in FIG. 2, the three-phase coils 24$u$, 24$v$, 24$w$ are connected to form a Y-connection. The rotor 22 and the rotary shaft 21 rotate when the three-phase coils 24$u$, 24$v$, 24$w$ are energized in a predetermined pattern. That is, the on-vehicle electric motor 11 of the present embodiment is a three-phase motor.

The manner in which the three-phase coils 24$u$, 24$v$, 24$w$ are connected together is not limited to a Y-connection, but may be a delta connection. The rotation speed and the acceleration of the on-vehicle electric motor 11 refer to the rotation speed and the acceleration of the rotor 22.

The compression unit 12 is configured to be driven by the on-vehicle electric motor 11 to compress fluid (refrigerant in the present embodiment). Specifically, when the rotary shaft 21 is rotated, the compression unit 12 compresses the refrigerant drawn from the external refrigerant circuit 102 and discharges the compressed refrigerant. The specific configuration of the compression unit 12 is not particularly limited and may be any type such as a scroll type, a piston type, or a vane type.

The inverter circuit 13 is configured to convert direct-current power supplied from the on-vehicle electricity storage device 104 into alternate-current power, thereby driving the on-vehicle electric motor 11 using the on-vehicle electricity storage device 104.

As shown in FIG. 2, the inverter circuit 13 includes three-phase switching elements Qu1 to Qw2. Specifically, the inverter circuit 13 includes u-phase switching elements Qu1, Qu2, which correspond to the u-phase coil 24$u$, v-phase switching elements Qv1, Qv2, which correspond to the v-phase coil 24$v$, and w-phase switching elements Qw1, Qw2, which correspond to the w-phase coil 24$w$.

The three-phase switching elements Qu1, Qu2, Qv1, Qv2, Qw1, and Qw2 (hereinafter, simply referred to as the three-phase switching elements Qu1 to Qw2) are each a power switching element including an insulated gate bipolar transistor (IGBT). The three-phase switching elements Qu1 to Qw2 are not limited to IGBTs, but may be any type of switching elements. For example, metal-oxide semiconductor field-effect transistors (MOSFETs) may be employed. The three-phase switching elements Qu1 to Qw2 include freewheeling diodes (body diodes) Du1 to Dw2.

The u-phase switching elements Qu1, Qu2 are connected to each other in series by a connection wire that is connected to the u-phase coil 24u. The collector of the u-phase switching element Qu1 is connected to the positive electrode terminal, which is the high-voltage side, of the on-vehicle electricity storage device 104. The emitter of the u-phase switching element Qu2 is connected to the negative electrode terminal, which is the low-voltage side, of the on-vehicle electricity storage device 104.

Except for the connected coil, the other switching elements Qv1, Qv2, Qw1, Qw2 have the same connection structure as the u-phase switching elements Qu1, Qu2.

The inverter controller 14 is a controller having electronic components such as a CPU and a memory. The inverter controller 14 controls the inverter circuit 13, more specifically, the three-phase switching elements Qu1 to Qw2, in order to drive the on-vehicle electric motor 11.

The inverter controller 14 includes a voltage sensor 31. The voltage sensor 31 is a voltage acquiring unit that acquires a power supply voltage Vin, which is the voltage of the on-vehicle electricity storage device 104. The voltage sensor 31 acquires the power supply voltage Vin by detecting an input voltage of the inverter circuit 13.

The inverter controller 14 includes a current sensor 32, which detects a motor current that flows through the on-vehicle electric motor 11. The motor current in the present embodiment includes, for example, three-phase currents Iu, Iv, Iw flowing through the three-phase coils 24u, 24v, 24w.

As shown in FIG. 2, the inverter controller 14 includes a three-phase/two-phase converter 33, which converts the three-phase currents Iu, Iv, Iw detected by the current sensor 32 into a d-axis current Id and a q-axis current Iq (hereinafter referred to as two-phase currents Id, Iq), which are perpendicular to each other.

The d-axis current Id can be regarded as a current of the component in the axial direction of the magnetic flux of the rotor 22, that is, an exciting component current, and the q-axis current Iq can be regarded as a torque component current that contributes to the torque of the on-vehicle electric motor 11.

The inverter controller 14 includes a position-speed estimating unit (position estimating unit) 34, which estimates the rotational position and rotation speed of the rotor 22. The position-speed estimating unit 34 estimates the rotational position and an actual rotation speed Nr of the rotor 22, for example, on the basis of at least one of the set of the two-phase currents Id, Iq or a set of two-phase voltage command values Vdr, Vqr. Any unit can be used for the command rotation speed Nc and the actual rotation speed Nr. For example, revolutions per minute (rpm) may be employed.

The specific configuration of the position-speed estimating unit 34 is not particularly limited. For example, the position-speed estimating unit 34 may include an induced voltage calculating unit that calculates an induced voltage in the three-phase coils 24u, 24v, 24w on the basis of the two-phase currents Id, Iq, the d-axis voltage command value Vdr, the motor constant, and the like. In this case, the position-speed estimating unit 34 may estimate the rotational position and the actual rotation speed Nr of the rotor 22 on the basis of the induced voltage and the d-axis current Id of the two-phase currents Id, Iq.

The position-speed estimating unit 34 periodically acquires a detection result of the current sensor 32 and periodically estimates the rotational position and the actual rotation speed Nr of the rotor 22. As a result, the position-speed estimating unit 34 keeps track of the rotational position and the actual rotation speed Nr of the rotor 22. In the present embodiment, the position-speed estimating unit 34 corresponds to a speed acquiring unit, which acquires the rotation speed of the on-vehicle electric motor 11.

The inverter controller 14 includes an obtaining unit 35 and a rotation controlling unit (rotation controlling circuit) 36. The obtaining unit 35 obtains an external command value, which is delivered from the air conditioning ECU 103, which is an external device. The rotation controlling unit 36 controls rotation of the on-vehicle electric motor 11 on the basis of the external command value obtained by the obtaining unit 35 and the actual rotation speed Nr.

The obtaining unit 35 is, for example, a connector that electrically connect the air conditioning ECU 103 and the inverter controller 14 to each other. The obtaining unit 35 electrically connects the air conditioning ECU 103 and the inverter controller 14 to each other, so as to allow exchange of information. The obtaining unit 35 can also be regarded as an input unit to which various commands such as the command rotation speed Nc are inputted.

The external command value is, for example, the command rotation speed Nc. Specifically, the air conditioning ECU 103 calculates a necessary flow rate of refrigerant, for example, from the operational state of the on-vehicle air conditioner 101, and calculates the command rotation speed Nc that achieves the calculated flow rate. The air conditioning ECU 103 delivers the command rotation speed Nc to the inverter controller 14.

The external command value is not limited to the command rotation speed Nc, but any specific command content may be employed as long as the manner in which the on-vehicle electric motor 11 is driven can be defined. Also, the agent that outputs the external command value is not limited to the air conditioning ECU 103.

The rotation controlling unit 36 is electrically connected to the obtaining unit 35. The rotation controlling unit 36 is electrically connected to the air conditioning ECU 103 via the obtaining unit 35. The rotation controlling unit 36 receives the command rotation speed Nc obtained by the obtaining unit 35. That is, the rotation controlling unit 36 receives an external command value from the air conditioning ECU 103 via the obtaining unit 35.

The rotation controlling unit 36 is electrically connected to the voltage sensor 31 and is capable of acquiring the power supply voltage Vin.

The rotation controlling unit 36 is electrically connected to the position-speed estimating unit 34. Accordingly, the rotation controlling unit 36 is configured to acquire the rotational position and the actual rotation speed Nr of the rotor 22, which have been estimated by the position-speed estimating unit 34. The rotation controlling unit 36 is also configured to deliver parameters necessary for the estimation to the position-speed estimating unit 34.

The three-phase/two-phase converter 33 delivers the two-phase currents Id, Iq to both of the position-speed estimating unit 34 and the rotation controlling unit 36. This allows the rotation controlling unit 36 to acquire the two-phase currents Id, Iq.

The rotation controlling unit 36 performs pulse-width modulation (PWM) control for the three-phase switching elements Qu1to Qw2 of the inverter circuit 13, thereby executing a rotation control process that controls rotation of the on-vehicle electric motor 11 (specifically, the rotor 22).

The specific hardware configuration of the rotation controlling unit 36 is not particularly limited. For example, the rotation controlling unit 36 may include a memory that stores a program of the rotation control process and/or necessary information, and a CPU that executes the rotation control process on the basis of the program.

In addition, the rotation controlling unit 36 may include one or more hardware circuits that execute part or all of the rotation control process. Alternatively, the rotation controlling unit 36 may be a combination of one or more hardware circuits and a CPU that executes software processing. In other words, the rotation controlling unit 36 may include, for example, at least one dedicated hardware circuit and at least one processor (control circuit) that operates in accordance with a computer program (software).

For the illustrative purposes, the rotation control process implemented by the rotation controlling unit 36 will be described in accordance with the flowchart of FIG. 3.

Figure 3:
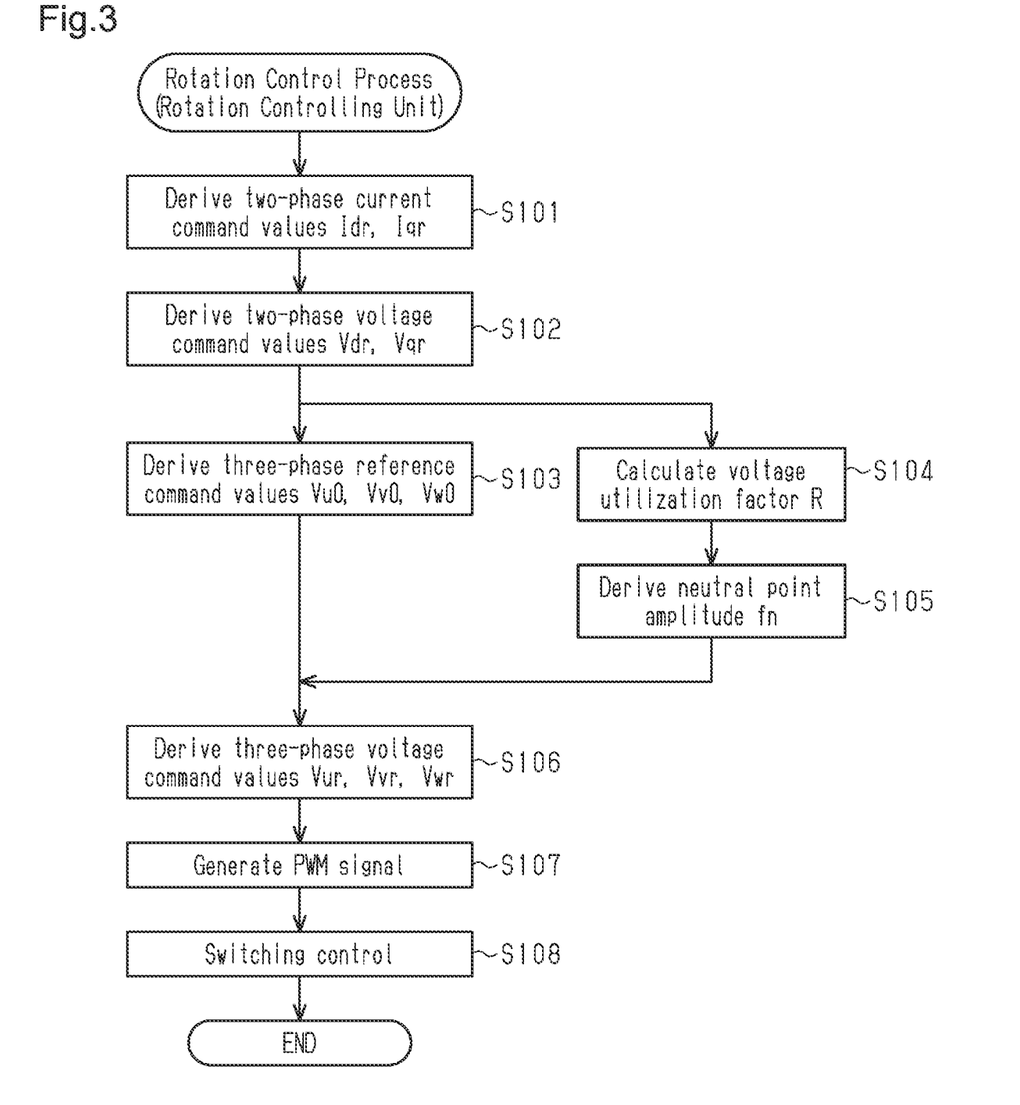
FIG. 3 is a flowchart showing a rotation control process.

As shown in FIG. 3, the rotation controlling unit 36 first derives, in step S101, the two-phase current command values Idr, Iqr on the basis of the external command value (the command rotation speed Nc in the present embodiment) obtained by the obtaining unit 35, and the actual rotation speed Nr, which is acquired (estimated, in the present embodiment) by the position-speed estimating unit 34. The two-phase current command values Idr, Iqr are a d-axis current command value Idr, which is a target value of the d-axis current Id, and a q-axis current command value Iqr, which is a target value of the q-axis current Iq.

Thereafter, in step S102, the rotation controlling unit 36 derives two-phase voltage command values Vdr, Vqr on the basis of the two-phase current command values Idr, Iqr and the two-phase currents Id, Iq obtained by the three-phase/two-phase converter 33. The two-phase voltage command values Vdr, Vqr include a d-axis voltage command value Vdr and a q-axis voltage command value Vqr. The d-axis voltage command value Vdr is a target value of the voltage applied to the d-axis of the on-vehicle electric motor 11, and the q-axis voltage command value Vqr is a target value of the voltage applied to the q-axis of the on-vehicle electric motor 11.

The rotation controlling unit 36 outputs the two-phase voltage command values Vdr, Vqr to the position-speed estimating unit 34. The position-speed estimating unit 34 uses at least one of the two-phase voltage command values Vdr, Vqr to estimate the position and the actual rotation speed Nr of the rotor 22.

In steps S103 to S106, the rotation controlling unit 36 executes a process that derives three-phase voltage command values Vur, Vvr, Vwr on the basis of the two-phase voltage command values Vdr, Vqr.

The three-phase voltage command values Vur, Vvr, Vwr include a u-phase voltage command value Vur, a v-phase voltage command value Vvr, and a w-phase voltage command value Vwr. The u-phase voltage command value Vur is a target value of the voltage applied to the u-phase coil 24u. The v-phase voltage command value Vvr is a target value of the voltage applied to the v-phase coil 24v. The w-phase voltage command value Vwr is a target value of the voltage applied to the w-phase coil 24w.

Specifically, the rotation controlling unit 36 derives three-phase reference command values Vu0, Vv0, Vw0 on the basis of the two-phase voltage command values Vdr, Vqr in step S103. For example, the rotation controlling unit 36 derives the three-phase reference command values Vu0, Vv0, Vw0 by subjecting the two-phase voltage command values Vdr, Vqr to two-phase to three-phase conversion.

The three-phase reference command values Vu0, Vv0, Vw0 change in accordance with an electrical angle. For example, the three-phase reference command values Vu0, Vv0, Vw0 each have a waveform having a reference amplitude f0, of which one period corresponds to 0° to 360° of an electrical angle. The three-phase reference command values Vu0, Vv0, Vw0 have different phases that are displaced, for example, by 120° from one another. The three-phase reference command values Vu0, Vv0, Vw0 may have any waveform such as a sine wave, a triangular wave, a rectangular wave, or a combination of these waveforms.

Separately from step S103, the rotation controlling unit 36 calculates a voltage utilization factor R on the basis of the two-phase voltage command values Vdr, Vqr and the power supply voltage Vin in step S104. The voltage utilization factor R is the utilization factor of the power supply voltage Vin required to apply the two-phase voltage command values Vdr, Vqr to the on-vehicle electric motor 11. For example, the voltage utilization factor R is the ratio of the effective value of the two-phase voltage command values Vdr, Vqr to the power supply voltage Vin, or a parameter obtained by adding a correction parameter to that ratio or by multiplying the ratio by a correction parameter.

Since the line voltage of the three-phase coils 24u, 24v, 24w changes in accordance with the two-phase voltage command values Vdr, Vqr, the voltage utilization factor R can be regarded as the ratio of the line voltage of the three-phase coils 24u, 24v, 24w to the power supply voltage Vin. In other words, the voltage utilization factor R is a parameter that indicates the utilization factor of the power supply voltage Vin in order that the line voltage of the three-phase coils 24u, 24v, 24w becomes a value that corresponds to the two-phase voltage command values Vdr, Vqr.

The reference amplitude f0, which is the amplitude of the three-phase reference command values Vu0, Vv0, Vw0 derived in step S103, decreases as the voltage utilization factor R decreases. For example, if the reference amplitude f0 in a case where the voltage utilization factor R is a first voltage utilization factor R1 and the reference amplitude f0 in a case where the voltage utilization factor R is a second voltage utilization factor R2, which is less than the first voltage utilization factor R1, the reference amplitude f0 in a case where the voltage utilization factor R is the second voltage utilization factor R2 is less than the reference amplitude f0 in a case where the voltage utilization factor R is the first voltage utilization factor R1. When the reference amplitude f0 decreases, the variation range of the three-phase reference command values Vu0, Vv0, Vw0 (specifically, the range from the minimum value to the maximum value) is likely to narrow. Thus, the ON/OFF duty cycle of the three-phase switching elements Qu1 to Qw2 is less likely to tilt toward a specific value when the voltage utilization factor R is the second voltage utilization factor R2 than when the voltage utilization factor R is the first voltage utilization factor R1.

After calculating the voltage utilization factor R, the rotation controlling unit 36 derives a neutral point amplitude fn, which is the amplitude of a neutral point potential En to be changed, on the basis of the voltage utilization factor R in step S105. The neutral point potential En is the potential of the neutral point of the three-phase voltage command values Vur, Vvr, Vwr.

The rotation controlling unit 36 varies the neutral point amplitude fn in accordance with the voltage utilization factor R. Specifically, when the voltage utilization factor R is the first voltage utilization factor R1, the rotation controlling unit 36 derives a first neutral point amplitude fn1 as the neutral point amplitude fn. When the voltage utilization factor R is the second voltage utilization factor R2, which is less than the first voltage utilization factor R1, the rotation controlling unit 36 derives a second neutral point amplitude fn2, which is greater than the first neutral point amplitude fn1, as the neutral point amplitude fn. In the present embodiment, the rotation controlling unit 36 increases the neutral point amplitude fn as the voltage utilization factor R decreases.

The specific manner in which the neutral point amplitude fn is determined is not particularly limited. For example, the neutral point amplitude fn that corresponds to the voltage utilization factor R may be derived using a predetermined mathematical expression. Alternatively, mapping data in which the voltage utilization factor R is associated with the neutral point amplitude fn may be stored in a memory, and the rotation controlling unit 36 may refer to the mapping data in order to derive the neutral point amplitude fn that corresponds to the currently calculated voltage utilization factor R.

After deriving the three-phase reference command values Vu0, Vv0, Vw0 and the neutral point amplitude fn, the rotation controlling unit 36 derives, in step S106, the three-phase voltage command values Vur, Vvr, Vwr, which are obtained by varying the neutral point amplitude fn at the neutral point potential En.

Specifically, the rotation controlling unit 36 derives the three-phase voltage command values Vur, Vvr, Vwr by superimposing the neutral point potential En of the neutral point amplitude fn on the three-phase reference command values Vu0, Vv0, Vw0. That is, the rotation controlling unit 36 derives the three-phase voltage command values Vur, Vvr, Vwr by adding (or subtracting) the neutral point potential En to (or from) the three-phase reference command values Vu0, Vv0, Vw0, which change in accordance with the electrical angle, while changing the neutral point potential En at the neutral point amplitude fn in accordance with the electrical angle. In other words, the rotation controlling unit 36 derives the three-phase voltage command values Vur, Vvr, Vwr by superimposing the neutral point potential En of the neutral point amplitude fn on the waveforms of the three-phase reference command values Vu0, Vv0, Vw0. The period of the neutral point potential En at which superimposing is performed is, for example, 120°.

Specifically, when the voltage utilization factor R is the first voltage utilization factor R1, the rotation controlling unit 36 derives first three-phase voltage command values Vur1, Vvr1, Vwr1 by superimposing the neutral point potential En of the first neutral point amplitude fn1 on the three-phase reference command values Vu0, Vv0, Vw0 that correspond to the first voltage utilization factor R1.

Also, when the voltage utilization factor R is the second voltage utilization factor R2, the rotation controlling unit 36 derives second three-phase voltage command values Vur2, Vvr2, Vwr2 by superimposing the neutral point potential En of the second neutral point amplitude fn2 on the three-phase reference command values Vu0, Vv0, Vw0 that correspond to the second voltage utilization factor R2.

As described above, the second neutral point amplitude fn2 is greater than the first neutral point amplitude fn1. Thus, even when the voltage utilization factor R is the second voltage utilization factor R2 so that the reference amplitude f0 decreases, the variation range of the second three-phase voltage command values Vur2, Vvr2, Vwr2 is unlikely to narrow.

In the present embodiment, the rotation controlling unit 36 derives the neutral point amplitude fn in correspondence with the reference amplitude f0, which changes in accordance with the voltage utilization factor R, such that the variation range of the three-phase voltage command values Vur, Vvr, Vwr remains constant regardless of the voltage utilization factor R.

The variation range of the three-phase voltage command values Vur, Vvr, Vwr may be larger than or equal to a predetermined threshold regardless of the voltage utilization factor R. For example, in a case in which the ratio of the minimum value of the three-phase voltage command values Vur, Vvr, Vwr to the power supply voltage Vin is referred to as a minimum ratio, and the ratio of the maximum value of the three-phase voltage command values Vur, Vvr, Vwr to the power supply voltage Vin is referred to as a maximum ratio, the range from the minimum ratio to the maximum ratio may be larger than or equal to a threshold range. In other words, the rotation controlling unit 36 derives the neutral point amplitude fn in correspondence with the voltage utilization factor R such that the range from the minimum ratio to the maximum ratio is larger than or equal to the threshold range, thereby changing the neutral point potential En only by an amount corresponding to the neutral point amplitude fn.

In the present embodiment, the rotation controlling unit 36 adjusts the neutral point amplitude fn such that the three-phase voltage command values Vur, Vvr, Vwr do not exceed the power supply voltage Vin. For example, when the voltage utilization factor R is the first voltage utilization factor R1, the rotation controlling unit 36 derives the first neutral point amplitude fn1 such that the value obtained by adding (or subtracting) the neutral point potential En of the first neutral point amplitude fn1 to (or from) the three-phase reference command values Vu0, Vv0, Vw0 falls inside the range from 0 V to the power supply voltage Vin. This prevents the first three-phase voltage command values Vur1, Vvr1, Vwr1 from being maintained at the power supply voltage Vin.

The second neutral point amplitude fn2 may be greater than the reference amplitude f0 corresponding to the second voltage utilization factor R2. That is, the rotation controlling unit 36 may superimpose the neutral point potential En of which the amplitude is greater than the reference amplitude f0. On the other hand, the first neutral point amplitude fn1 may be greater than the reference amplitude f0 corresponding to the first voltage utilization factor R1. That is, the rotation controlling unit 36 may superimpose the neutral point potential En of which the amplitude is greater than the reference amplitude f0.

In other words, the rotation controlling unit 36 switches between a control that changes the neutral point potential En at an amplitude that is greater than the reference amplitude f0 in accordance with the voltage utilization factor R, thereby deriving the three-phase voltage command values Vur, Vvr, Vwr, and a control that changes the neutral point potential En at an amplitude that is less than the reference amplitude f0, thereby deriving the three-phase voltage command values Vur, Vvr, Vwr.

After deriving the three-phase voltage command values Vur, Vvr, Vwr, the rotation controlling unit 36 generates, in step S107, a PWM signal, in which a switching pattern (specifically, a duty cycle) of the three-phase switching elements Qu1 to Qw2 are set on the basis of the three-phase voltage command values Vur, Vvr, Vwr and a carrier signal. In step S108, the rotation controlling unit 36 performs switching control of the three-phase switching elements Qu1 to Qw2 by using the generated PWM signal.

In the present embodiment, the rotation controlling unit 36 executing the processes of steps S101, S102 corresponds to a two-phase voltage command value deriving unit. The rotation controlling unit 36 executing the processes of steps S103 to S106 corresponds to a three-phase voltage command value deriving unit. The rotation controlling unit 36 executing the process of step S103 corresponds to a reference generating unit. The rotation controlling unit 36 executing the process of step S106 corresponds to a superimposing unit.

For the illustrative purposes, the description is based on the flowchart. However, the order of processes of steps S103 to S106 may be changed. For example, the rotation controlling unit 36 may execute the processes of steps S104 and S105 after executing the process of step S103, and then execute the process of step S106. Also, the rotation controlling unit 36 may execute the process of step S103 after executing the processes of steps S104 and S105. That is, the process of step S103 and the processes of the steps S104, S105 do not need to be executed in parallel. As described above, part or all of the processes of steps S103 to S106 may be executed by a dedicated hardware circuit.

Figure 4:
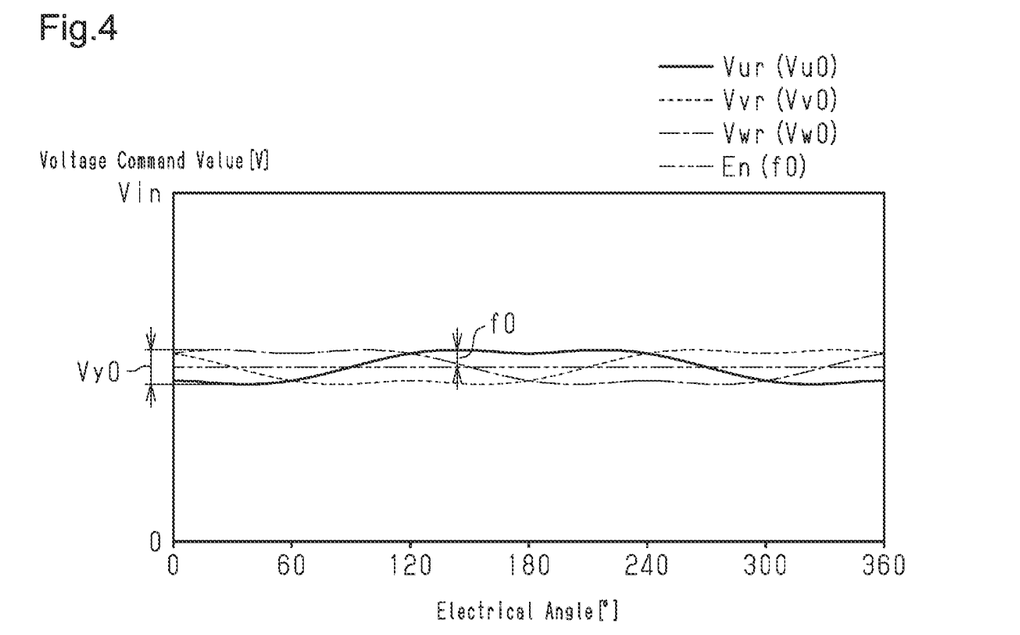
FIG. 4 is a graph showing three-phase voltage command values in a case in which a neutral point potential is not changed under a condition in which a voltage utilization factor is a second voltage utilization factor.
Figure 5:
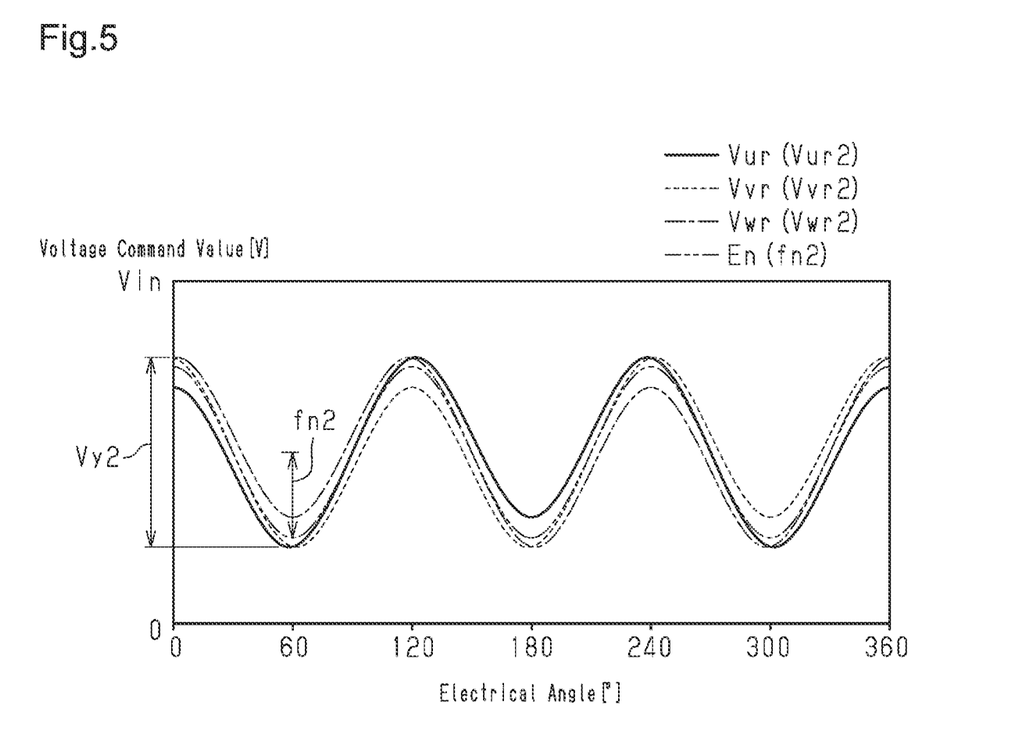
FIG. 5 is a graph showing the three-phase voltage command values in a case in which the neutral point potential is changed at a second neutral point amplitude under a condition in which the voltage utilization factor is the second voltage utilization factor.
Figure 6:
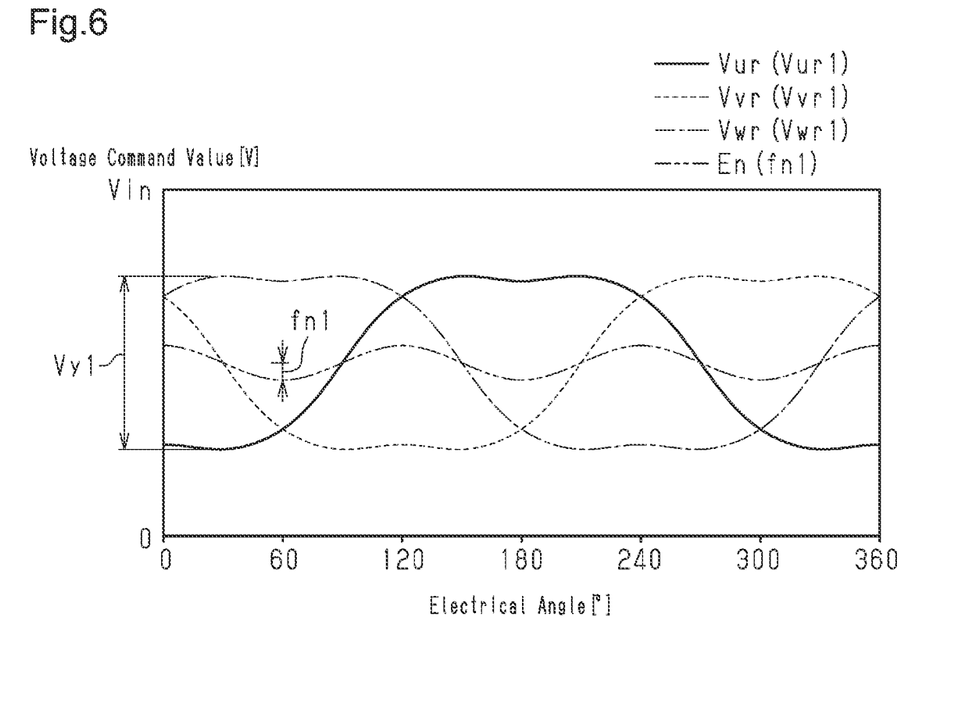
FIG. 6 is a graph showing the three-phase voltage command values in a case in which the neutral point potential is changed at a first neutral point amplitude under a condition in which the voltage utilization factor is a first voltage utilization factor.

An operation of the present embodiment will now be described with reference to FIGS. 4 to 6. FIG. 4 is a graph showing a comparative example. Specifically, FIG. 4 is a graph showing the three-phase voltage command values Vur, Vvr, Vwr in a case in which the neutral point potential En is not changed under a condition in which the voltage utilization factor R is the second voltage utilization factor R2. On the other hand, FIG. 5 is a graph showing the three-phase voltage command values Vur, Vvr, Vwr in a case in which the neutral point potential En is changed at the second neutral point amplitude fn2 under a condition in which the voltage utilization factor R is the second voltage utilization factor R2. FIG. 6 is a graph showing the three-phase voltage command values Vur, Vvr, Vwr in a case in which the neutral point potential En is changed at the first neutral point amplitude fn1 under a condition in which the voltage utilization factor R is the first voltage utilization factor R1.

When the neutral point potential En does not change under a condition in which the voltage utilization factor R is the second voltage utilization factor R2 as shown in FIG. 4, the three-phase voltage command values Vur, Vvr, Vwr are maintained at the three-phase reference command values Vu0, Vv0, Vw0. Thus, the three-phase voltage command values Vur, Vvr, Vwr change within a reference range Vy0, which is the variation range of the three-phase reference command values Vu0, Vv0, Vw0. In this case, if the reference range Vy0 is narrow in correspondence with a small value of the second voltage utilization factor R2, the amount of change of the three-phase voltage command values Vur, Vvr, Vwr is small. In such a case, since the three-phase voltage command values Vur, Vvr, Vwr are likely to tilt toward a specific value or a value close to the specific value, the three-phase switching elements Qu1 to Qw2 are periodically turned on and off with a specific duty cycle or a duty cycle close to the specific duty cycle. This is likely to generate noise of a specific frequency that corresponds to the specific duty cycle.

In contrast, the second three-phase voltage command values Vur2, Vvr2, Vwr2, which have been derived by changing the neutral point potential En at the second neutral point amplitude fn2 in a situation where the voltage utilization factor R is the second voltage utilization factor R2, change more largely than the three-phase reference command values Vu0, Vv0, Vw0 as shown in FIG. 5. Specifically, when the variation range of the second three-phase voltage command values Vur2, Vvr2, Vwr2 is referred to as a second variation range Vy2, the second variation range Vy2 is larger than the reference range Vy0. Accordingly, since the amount of change of the second three-phase voltage command values Vur2, Vvr2, Vwr2 in relation to a change in the electrical angle is likely to increase, the duty cycle of the three-phase switching elements Qu1 to Qw2 easily changes. Thus, the three-phase switching elements Qu1 to Qw2 are unlikely to be periodically turned on and off with a specific duty cycle or a duty cycle close to the specific duty cycle.

Particularly, in the present embodiment, the second neutral point amplitude fn2 is set to be greater than the reference amplitude f0. Accordingly, the second three-phase voltage command values Vur2, Vvr2, Vwr2 have waveforms in which the neutral point potential En is dominant. Therefore, even if the reference amplitude f0 is small, the second variation range Vy2 is large.

Even if the neutral point potential En is superimposed, the line voltage applied to the three-phase coils 24u, 24v, 24w does not change. The on-vehicle electric motor 11 receives a torque equivalent to the three-phase reference command values Vu0, Vv0, Vw0.

Also, when the voltage utilization factor R is the first voltage utilization factor R1, the neutral point potential En of the first neutral point amplitude fn1, which is less than the second neutral point amplitude fn2, is superimposed as shown in FIG. 6. Accordingly, a first variation range Vy1, which is the variation range of the first three-phase voltage command values Vur1, Vvr1, Vwr1, falls inside the voltage range that can be outputted by the on-vehicle electricity storage device 104. That is, the first three-phase voltage command values Vur1, Vvr1, Vwr1 are prevented from exceeding the power supply voltage Vin. In other words, in a situation where the voltage utilization factor R is relatively high, the neutral point amplitude fn decreases accordingly. This shortens the period for which the three-phase voltage command values Vur, Vvr, Vwr are maintained at the maximum value or the minimum value.

The present embodiment, which has been described above, achieves the following advantages.

(1) The inverter controller 14 is used to control the inverter circuit 13, which drives the on-vehicle electric motor 11 using the on-vehicle electricity storage device 104. The on-vehicle electric motor 11 includes the three-phase coils 24u, 24v, 24w, and the inverter circuit 13 includes the three-phase switching elements Qu1 to Qw2.

The inverter controller 14 includes the position-speed estimating unit 34, the voltage sensor 31, and the rotation controlling unit 36. The position-speed estimating unit 34 acquires the actual rotation speed Nr, which is the rotation speed of the on-vehicle electric motor 11. The voltage sensor 31 acquires a power supply voltage Vin, which is the voltage of the on-vehicle electricity storage device 104. The rotation controlling unit 36 executes a process that derives the two-phase voltage command values Vdr, Vqr, which are target values of the voltages applied to the d-axis and the q-axis of the on-vehicle electric motor 11 on the basis of the external command value delivered from an external device and the actual rotation speed Nr, and a process that derives the three-phase voltage command values Vur, Vvr, Vwr on the basis of the two-phase voltage command values Vdr, Vqr. The rotation controlling unit 36 then subjects the three-phase switching elements Qu1 to Qw2 to PWM control on the basis of the three-phase voltage command values Vur, Vvr, Vwr.

In this configuration, in the process that derives the three-phase voltage command values Vur, Vvr, Vwr, the rotation controlling unit 36 changes the three-phase voltage command values Vur, Vvr, Vwr in accordance with the voltage utilization factor R, which is calculated on the basis of the two-phase voltage command values Vdr, Vqr and the power supply voltage Vin.

Specifically, when the voltage utilization factor R is the first voltage utilization factor R1, the rotation controlling unit 36 derives the first three-phase voltage command values Vur1, Vvr1, Vwr1, which are obtained by changing the neutral point potential En of the three-phase voltage command values Vur, Vvr, Vwr with the first neutral point amplitude fn1. Also, when the voltage utilization factor R is the second voltage utilization factor R2, which is less than the first voltage utilization factor R1, the rotation controlling unit 36 derives the second three-phase voltage command values Vur2, Vvr2, Vwr2 by changing the neutral point potential En of the three-phase voltage command values Vur, Vvr, Vwr at the second neutral point amplitude fn2. The second neutral point amplitude fn2 is greater than the first neutral point amplitude fn1.

With this configuration, when the voltage utilization factor R is the second voltage utilization factor R2, which is less than the first voltage utilization factor R1, the neutral point potential En changes at the second neutral point amplitude fn2, which is greater than the first neutral point amplitude fn1, which corresponds to the first voltage utilization factor R1. The second three-phase voltage command values Vur2, Vvr2, Vwr2, which have a variation range that is larger than or equal to at least the second neutral point amplitude fn2, are thus obtained. This prevents the variation range (the second variation range Vy2) of the second three-phase voltage command values Vur2, Vvr2, Vwr2 from narrowing. This also suppresses an increase in noise of a specific frequency due to narrowing of the variation range of the three-phase voltage command values Vur, Vvr, Vwr.

Particularly, when the voltage utilization factor R decreases, the variation range of the three-phase voltage command values Vur, Vvr, Vwr is normally likely to narrow. Thus, when the voltage utilization factor R is the second voltage utilization factor R2, the variation range of the three-phase voltage command values Vur, Vvr, Vwr is likely to narrow.

In this regard, with the present configuration, when the voltage utilization factor R is the second voltage utilization factor R2, the neutral point potential En is changed at the second neutral point amplitude fn2, which is relatively large, so that the variation range of the three-phase voltage command values Vur, Vvr, Vwr is prevented from narrowing even if the voltage utilization factor R is the second voltage utilization factor R2. This suppresses an increase in noise of a specific frequency.

Also, the first three-phase voltage command values Vur1, Vvr1, Vwr1, which are derived when the voltage utilization factor R is the first voltage utilization factor R1, are obtained by changing the neutral point potential En at the first neutral point amplitude fn1, which is less than the second neutral point amplitude fn2. This prevents the variation range (the first variation range Vy1) of the first three-phase voltage command values Vur1, Vvr1, Vwr1 from expanding excessively.

(2) In the process that derives the three-phase voltage command values Vur, Vvr, Vwr, the rotation controlling unit 36 executes the process of step S103, which generates the three-phase reference command values Vu0, Vv0, Vw0, which has the reference amplitude f0, on the basis of the two-phase voltage command values Vdr, Vqr. The rotation controlling unit 36 then executes the process of step S106 that derives the three-phase voltage command values Vur, Vvr, Vwr by superimposing the neutral point potential En on the three-phase reference command values Vu0, Vv0, Vw0.

When the voltage utilization factor R is the first voltage utilization factor R1, the rotation controlling unit 36 superimposes the neutral point potential En of the first neutral point amplitude fn1 on the three-phase reference command values Vu0, Vv0, Vw0 in step S106. Also, when the voltage utilization factor R is the second voltage utilization factor R2, the rotation controlling unit 36 superimposes the neutral point potential En of the second neutral point amplitude fn2 on the three-phase reference command values Vu0, Vv0, Vw0.

This configuration derives the three-phase voltage command values Vur, Vvr, Vwr by superimposing the neutral point potential En on the three-phase reference command values Vu0, Vv0, Vw0. In this case, the variation range of the three-phase voltage command values Vur, Vvr, Vwr expands by an amount corresponding to the neutral point amplitude fn, without changing the line voltage applied to the three-phase coils 24u, 24v, 24w. Then, in a case where the voltage utilization factor R is the first voltage utilization factor R1, the neutral point potential En of the first neutral point amplitude fn1 is superimposed. In a case where the voltage utilization factor R is the second voltage utilization factor R2, the neutral point potential En of the second neutral point amplitude fn2 is superimposed. Accordingly, the above described advantage is achieved without affecting the behavior of the on-vehicle electric motor 11.

(3) The rotation controlling unit 36 generates the three-phase reference command values Vu0, Vv0, Vw0 by subjecting the two-phase voltage command values Vdr, Vqr to two-phase to three-phase conversion. When the voltage utilization factor R is the first voltage utilization factor R1, the rotation controlling unit 36 derives the first three-phase voltage command values Vur1, Vvr1, Vwr1 by changing the neutral point potential En at the first neutral point amplitude fn1, which is less than the reference amplitude f0. When the utilization factor R is the second voltage utilization factor R2, the rotation controlling unit 36 derives the second three-phase voltage command values Vur2, Vvr2, Vwr2 by changing the neutral point potential En at the second neutral point amplitude fn2, which is greater than the reference amplitude f0.

With this configuration, the second three-phase voltage command values Vur2, Vvr2, Vwr2 have waveforms in which the neutral point potential En is dominant. This ensures a certain variation range of the three-phase voltage command values Vur, Vvr, Vwr even if the reference amplitude f0 is small. Therefore, the noise of the specific frequency is suppressed.

On the other hand, the first three-phase voltage command values Vur1, Vvr1, Vwr1 have waveforms in which the three-phase reference command values Vu0, Vv0, Vw0 are dominant. This suppresses the influence of a change in the neutral point potential En, thereby preventing the variation range of the three-phase voltage command values Vur, Vvr, Vwr from expanding excessively.

(4) The rotation controlling unit 36 derives the three-phase voltage command values Vur, Vvr, Vwr by increasing the neutral point amplitude fn as the voltage utilization factor R decreases.

This configuration increases the neutral point amplitude fn as the voltage utilization factor R decreases. This prevents the variation range of the three-phase voltage command values Vur, Vvr, Vwr from narrowing as the voltage utilization factor R decreases.

(5) When the voltage utilization factor R is the first voltage utilization factor R1, the rotation controlling unit 36 adjusts the first neutral point amplitude fn1 such that the first three-phase voltage command values Vur1, Vvr1, Vwr1 do not exceed the power supply voltage Vin.

This configuration prevents the first three-phase voltage command values Vur1, Vvr1, Vwr1 from being maintained at the power supply voltage Vin due to a change in the neutral point potential En.

The above-described embodiment may be modified as follows.

The specific configuration for deriving the three-phase voltage command values Vur, Vvr, Vwr on the basis of the two-phase voltage command values Vdr, Vqr and the voltage utilization factor R is not limited to the one described in the embodiment.

Figure 7:
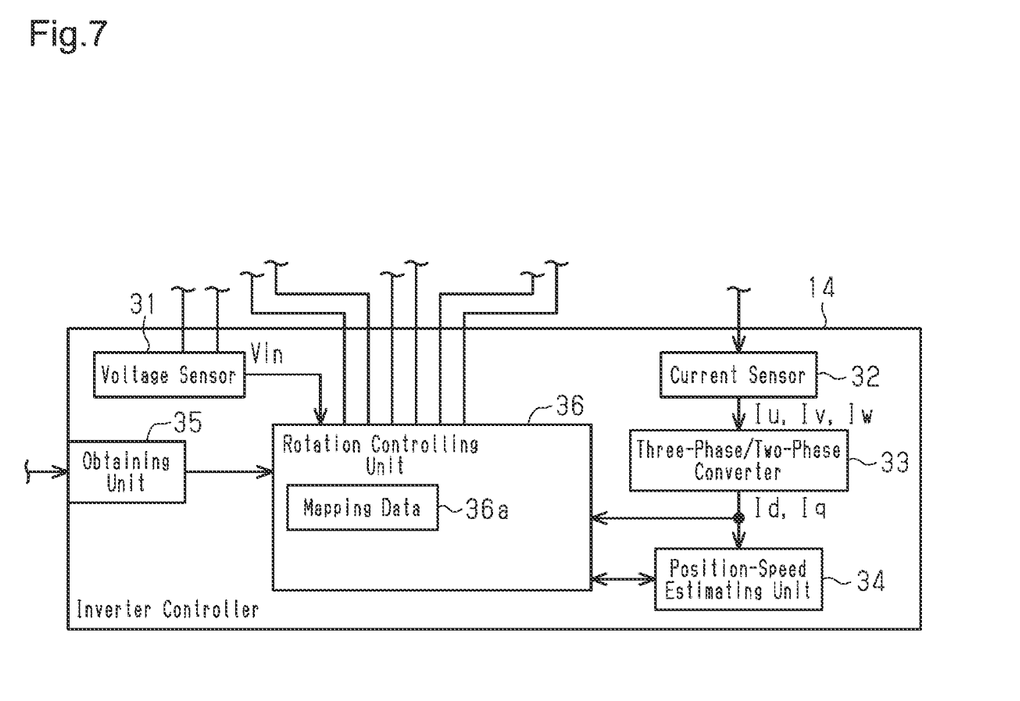
FIG. 7 is a block diagram showing an electrical configuration of an inverter controller according to a modification.

For example, as shown in FIG. 7, the rotation controlling unit 36 may include a mapping data 36a, in which the two-phase voltage command values Vdr, Vqr, the voltage utilization factor R, and the three-phase voltage command values Vur, Vvr, Vwr are associated with one another. In this case, after deriving the two-phase voltage command values Vdr, Vqr and the voltage utilization factor R, the rotation controlling unit 36 refers to the mapping data 36a to derive the three-phase voltage command values Vur, Vvr, Vwr that correspond to the two-phase voltage command values Vdr, Vqr and the voltage utilization factor R, which are derived in the current cycle.

In this configuration, the three-phase voltage command values Vur, Vvr, Vwr set in the mapping data 36a are values obtained by superimposing the neutral point amplitude fn that corresponds to the voltage utilization factor R on the three-phase reference command values Vu0, Vv0, Vw0, which are obtained by subjecting the two-phase voltage command values Vdr, Vqr to two-phase to three-phase conversion.

In this configuration, the mapping data 36a stores, in advance, the two-phase voltage command values Vdr, Vqr derived in the current cycle and the three-phase voltage command values Vur, Vvr, Vwr that correspond to the voltage utilization factor R. It is thus unnecessary to execute the two-phase to three-phase conversion, the deriving of the neutral point amplitude fn, and the calculation for superimposing the neutral point potential En. This reduces the processing load on the rotation controlling unit 36.

The manner in which the neutral point amplitude fn is changed in accordance with the voltage utilization factor R may be changed as long as the neutral point amplitude fn is greater when the voltage utilization factor R is the second voltage utilization factor R2 than when the voltage utilization factor R is the first voltage utilization factor R1.

The neutral point amplitude fn may change in an analogue manner Specifically, the neutral point amplitude fn may gradually increase as the voltage utilization factor R decreases. For example, the rotation controlling unit 36 may derive the neutral point amplitude fn such that the neutral point amplitude fn gradually increases as the voltage utilization factor R changes from the first voltage utilization factor R1 to the second voltage utilization factor R2.

The neutral point amplitude fn may change in a digital manner in accordance with the voltage utilization factor R. For example, a value of the voltage utilization factor R that is less than the first voltage utilization factor R1 and greater than the second voltage utilization factor R2 may be used as a utilization factor threshold Rth. In this case, when the voltage utilization factor R is greater than or equal to the utilization factor threshold Rth, the rotation controlling unit 36 derives the three-phase voltage command values Vur, Vvr, Vwr by changing the neutral point potential En at the first neutral point amplitude fn1. On the other hand, when the voltage utilization factor R is less than the utilization factor threshold Rth, the rotation controlling unit 36 derives the three-phase voltage command values Vur, Vvr, Vwr by changing the neutral point potential En at the second neutral point amplitude fn2.

The rotation controlling unit 36 may derive the neutral point amplitude fn that is less than the first neutral point amplitude fn1 when the voltage utilization factor R exceeds the first voltage utilization factor R1, and may derive the neutral point amplitude fn that is greater than the second neutral point amplitude fn2 when the voltage utilization factor R drops below the second voltage utilization factor R2.

The rotation controlling unit 36 may derive the first neutral point amplitude fn1 when the voltage utilization factor R exceeds the first voltage utilization factor R1, and may derive the second neutral point amplitude fn2 when the voltage utilization factor R drops below the second voltage utilization factor R2. That is, the first neutral point amplitude fn1 may be the minimum value of the neutral point amplitude fn, which is derived on the basis of the voltage utilization factor R. Alternatively, the first neutral point amplitude fn1 does not necessarily need to be the minimum value. Also, the second neutral point amplitude fn2 may be the maximum value of the neutral point amplitude fn, which is derived on the basis of the voltage utilization factor R. Alternatively, the second neutral point amplitude fn2 does not necessarily need to be the maximum value.

In the above-described embodiments, the rotation controlling unit 36 derives the neutral point amplitude fn in correspondence with the reference amplitude f0, which changes in accordance with the voltage utilization factor R, such that the variation range of the three-phase voltage command values Vur, Vvr, Vwr remains constant regardless of the voltage utilization factor R. The present disclosure is not limited to this. That is, the variation range of the three-phase voltage command values Vur, Vvr, Vwr may be changed in accordance with the voltage utilization factor R.

The rotation controlling unit 36 may be configured to not superimpose the neutral point potential En under a certain condition. The certain condition is not particularly limited. For example, the certain condition may be a state in which the voltage utilization factor R is greater than or equal to a predetermined threshold. Alternatively, the certain condition may be a state in which the modulation method is two-phase modulation.

The configuration for acquiring the actual rotation speed Nr is not limited to the position-speed estimating unit 34. For example, a dedicated sensor (resolver) may be employed. That is, the speed acquiring unit is not limited to the one that acquires the actual rotation speed Nr by estimating it, but may be a configuration, such as a resolver, that actually detects the actual rotation speed Nr.

The specific configuration of the obtaining unit 35 is not particularly limited as long as it is capable of receiving external command values delivered from the air conditioning ECU 103. For example, in the configuration in which the air conditioning ECU 103 delivers commands using wireless signals, the obtaining unit 35 may be a module that receives the wireless signals.

The configuration for acquiring the power supply voltage Vin, which is the voltage of the on-vehicle electricity storage device 104 is not limited to the voltage sensor 31. For example, in a case in which the on-vehicle electricity storage device 104 is provided with the voltage sensor 31, which detects the power supply voltage Vin, and a battery CPU electrically connected to the voltage sensor 31, the rotation controlling unit 36 may obtain the power supply voltage Vin by communicating with the battery CPU. In this case, the rotation controlling unit 36 communicating with the battery CPU corresponds to the voltage acquiring unit.

The on-vehicle motor-driven compressor 10 does not necessarily need to be employed in the on-vehicle air conditioner 101, but may be employed in another apparatus. For example, if the vehicle 100 is a fuel cell vehicle, the on-vehicle motor-driven compressor 10 may be employed in the air supplying device that supplies air to the fuel cell. That is, the fluid to be compressed is not limited to the refrigerant, but may be any fluid such as air.

The on-vehicle fluid machine is not limited to the on-vehicle motor-driven compressor 10 provided with the compression unit 12 for compressing fluid. For example, in the case in which the vehicle 100 is a fuel cell vehicle, the on-vehicle fluid machine may be an electric pump device having a pump that supplies hydrogen to the fuel cell and an on-vehicle electric motor that drives the pump. In this case, the inverter controller 14 may be used to control the on-vehicle electric motor that drives the pump.

The on-vehicle electric motor 11 does not necessarily need to be employed in the on-vehicle motor-driven compressor 10, but may be employed in any apparatus mounted on the vehicle. For example, the on-vehicle electric motor 11 may be a driving motor that drives the vehicle.

One example obtainable from the above embodiment and modifications will now be described.

An inverter controller used to control an inverter circuit that drives an on-vehicle electric motor by using an on-vehicle electricity storage device, wherein the on-vehicle electric motor includes three-phase coils,
the inverter circuit includes three-phase switching elements,
the inverter controller includes:
a speed acquiring unit that acquires a rotation speed of the on-vehicle electric motor;
a voltage acquiring unit that acquires a power supply voltage, which is a voltage of the on-vehicle electricity storage device;
a two-phase voltage command value deriving unit that derives two-phase voltage command values on a basis of an external command value delivered from an external device and an acquisition result of the speed acquiring unit, the two-phase voltage command values being target values of voltages applied to a d-axis and a q-axis of the on-vehicle electric motor; and
a three-phase voltage command value deriving unit that derives three-phase voltage command values applied to the three-phase coils on a basis of the two-phase voltage command values, the inverter controller subjects the three-phase switching elements to PWM control on a basis of the three-phase voltage command values, and the three-phase voltage command value deriving unit switches between a control that derives the three-phase voltage command values by changing a neutral point potential at an amplitude greater than a reference amplitude in accordance with a voltage utilization factor, the voltage utilization factor being calculated on a basis of the two-phase voltage command values and the acquisition result of the voltage acquiring unit, and the reference amplitude being an amplitude of three-phase reference command values that are obtained by subjecting the two-phase voltage command values to two-phase to three-phase conversion, and a control that derives the three-phase voltage command values by changing the neutral point potential at an amplitude less than the reference amplitude.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An inverter controller configured to control an inverter circuit that drives an on-vehicle electric motor by using an on-vehicle electricity storage device, wherein
the on-vehicle electric motor includes three-phase coils,
the inverter circuit includes three-phase switching elements,
the inverter controller comprises:
a speed acquiring unit configured to acquire a rotation speed of the on-vehicle electric motor;
a voltage acquiring unit configured to acquire a power supply voltage, which is a voltage of the on-vehicle electricity storage device;
a two-phase voltage command value deriving unit configured to derive two-phase voltage command values on a basis of an external command value delivered from an external device and an acquisition result of the speed acquiring unit, the two-phase voltage command values being target values of voltages applied to a d-axis and a q-axis of the on-vehicle electric motor; and
a three-phase voltage command value deriving unit configured to derive three-phase voltage command values applied to the three-phase coils on a basis of the two-phase voltage command values,
the inverter controller is configured to subject the three-phase switching elements to PWM control on a basis of the three-phase voltage command values, and
the three-phase voltage command value deriving unit is configured to
derive first three-phase voltage command values in a case in which a voltage utilization factor, which is calculated on a basis of the two-phase voltage command values and the acquisition result of the voltage acquiring unit, is a first voltage utilization factor, the first three-phase voltage command values being obtained by changing a neutral point potential of the three-phase voltage command values at a first neutral point amplitude, and derive second three-phase voltage command values in a case in which the voltage utilization factor is a second voltage utilization factor, which is less than the first voltage utilization factor, the second three-phase voltage command values being obtained by changing the neutral point potential with a second neutral point amplitude, which is greater than the first neutral point amplitude.

2. The inverter controller according to claim 1, wherein the three-phase voltage command value deriving unit includes
a reference generating unit configured to generate three-phase reference command values, which include a reference amplitude, on a basis of the two-phase voltage command values, and
a superimposing unit configured to derive the three-phase voltage command values by superimposing the neutral point potential on the three-phase reference command values, and
the superimposing unit is configured to
superimpose a neutral point potential of the first neutral point amplitude on the three-phase reference command values in a case in which the voltage utilization factor is the first voltage utilization factor, and
superimpose a neutral point potential of the second neutral point amplitude on the three-phase reference command values in a case in which the voltage utilization factor is the second voltage utilization factor.

3. The inverter controller according to claim 1, wherein the three-phase voltage command value deriving unit includes mapping data, in which the two-phase voltage command values, the voltage utilization factor, and the three-phase voltage command values are associated with one another,
the three-phase voltage command value deriving unit is configured to refer to the mapping data, thereby deriving the three-phase voltage command values that correspond to the two-phase voltage command values and the voltage utilization factor, and
the three-phase voltage command values are obtained by obtaining a three-phase reference command values by subjecting the two-phase voltage command values to two-phase to three-phase conversion, and superimposing, on the obtained three-phase reference command values, a neutral point potential that includes a neutral point amplitude that corresponds to the voltage utilization factor.

4. The inverter controller according to claim 1, wherein the three-phase voltage command value deriving unit is configured to change the amplitude of the neutral point potential by a greater amount as the voltage utilization factor decreases.

5. The inverter controller according to claim 1, wherein the three-phase voltage command value deriving unit is configured to adjust the first neutral point amplitude such that the first three-phase voltage command values do not exceed the power supply voltage in a case in which the voltage utilization factor is the first voltage utilization factor.

6. An on-vehicle fluid machine, comprising:
an on-vehicle electric motor;
an inverter circuit configured to drive the on-vehicle electric motor by using an on-vehicle electricity storage device; and
an inverter controller configured to control the inverter circuit, wherein
the on-vehicle electric motor includes three-phase coils,
the inverter circuit includes three-phase switching elements,
the inverter controller includes:
a speed acquiring unit configured to acquire a rotation speed of the on-vehicle electric motor;
a voltage acquiring unit configured to acquire a power supply voltage, which is a voltage of the on-vehicle electricity storage device;
a two-phase voltage command value deriving unit configured to derive two-phase voltage command values on a basis of an external command value delivered from an outside and an acquisition result of the speed acquiring unit, the two-phase voltage command values being target values of voltages applied to a d-axis and a q-axis of the on-vehicle electric motor; and
a three-phase voltage command value deriving unit configured to derive three-phase voltage command values applied to the three-phase coils on a basis of the two-phase voltage command values,
the inverter controller is configured to subject the three-phase switching elements to PWM control on a basis of the three-phase voltage command values, and
the three-phase voltage command value deriving unit is configured to
derive first three-phase voltage command values in a case in which a voltage utilization factor, which is calculated on a basis of the two-phase voltage command values and the acquisition result of the voltage acquiring unit, is a first voltage utilization factor, the first three-phase voltage command values being obtained by changing a neutral point potential of the three-phase voltage command values at a first neutral point amplitude, and
derive second three-phase voltage command values in a case in which the voltage utilization factor is a second voltage utilization factor, which is less than the first voltage utilization factor, the second three-phase voltage command values being obtained by changing the neutral point potential at a second neutral point amplitude, which is greater than the first neutral point amplitude.

7. The on-vehicle fluid machine according to claim 6, wherein the on-vehicle fluid machine is an on-vehicle motor-driven compressor that includes a compression unit driven by the on-vehicle electric motor.

* * * * *